United States Patent [19]

Huck

[11] Patent Number: 4,575,834
[45] Date of Patent: Mar. 11, 1986

[54] METHOD OF IMPROVING THE SIGNAL-TO-NOISE RATIO IN A CAPACITANCE ELECTRONIC DISC SYSTEM

[75] Inventor: Robert H. Huck, Indianapolis, Ind.

[73] Assignee: RCA Corporation, Princeton, N.J.

[21] Appl. No.: 432,971

[22] Filed: Oct. 5, 1982

[51] Int. Cl.[4] .......................... H04N 5/76; G11B 9/08
[52] U.S. Cl. .................................... 369/126; 369/276; 369/288; 369/286; 358/342; 428/447
[58] Field of Search .............. 369/126, 276, 286, 288; 358/342; 428/64–65, 908.8, 447

[56] References Cited

U.S. PATENT DOCUMENTS 3,843,399  10/1974  Kaplan et al. .................... 117/217
4,137,550  1/1979   Kaganowicz et al. ............. 369/126
4,228,050  10/1980  Martin et al. .................... 260/23 XA
4,275,101  6/1981   Wang et al. ...................... 369/286
4,416,789  11/1983  Shidlovsky et al. ............... 369/126

Primary Examiner—Robert L. Richardson
Attorney, Agent, or Firm—Birgit E. Morris; Howard F. VanDenburgh

[57] ABSTRACT

The audio signal-to-noise ratio obtainable in a capacitance electronic disc system which includes a conductive disc formed from a plastic resin containing conductive particles and a playback stylus is increased by spacing the playback stylus at a slight distance from the surface of the conductive disc. This spacing can be attained by depositing a thin coating of a dielectric material on the surface of the conductive disc.

7 Claims, 1 Drawing Figure

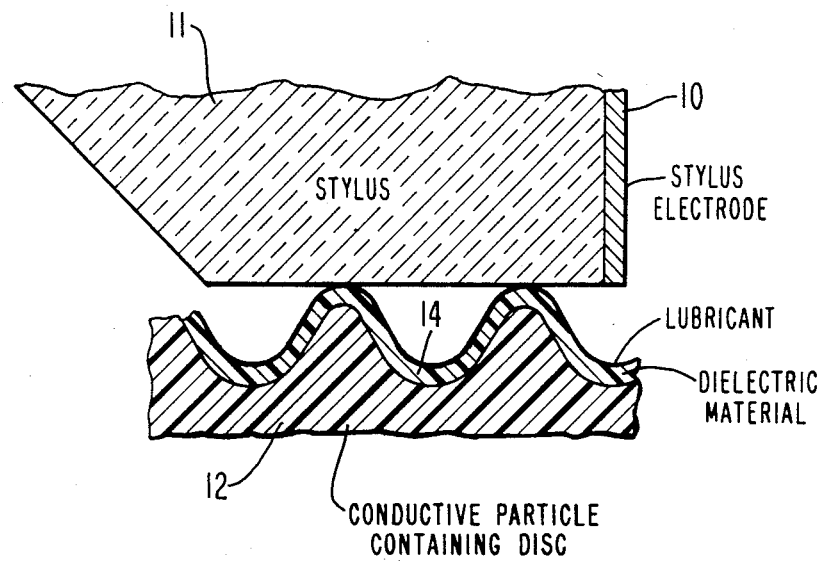

METHOD OF IMPROVING THE SIGNAL-TO-NOISE RATIO IN A CAPACITANCE ELECTRONIC DISC SYSTEM

This invention relates to a capacitance electronic disc system, also known as a video disc system. More particularly, the invention pertains to improvements in such a capacitance electronic disc system including a conductive disc formed from a plastic resin containing dispersed conductive particles and a dielectric playback stylus having an electrode face.

BACKGROUND OF THE INVENTION

A capacitance electronic disc system has been described by Clemens in U.S. Pat. No. 3,842,194. The system as described comprises a molded plastic disc having audio, video and color information in the form of geometric variations in a spiral groove in the disc surface. These discs are coated first with a conductive material, such as a metal layer, which acts as a first electrode, and then with a dielectric layer, such as an inert polymer layer. A metal tippped stylus acts as a second electrode of a capacitor, and the information signals are mointored by the stylus which notes changes in capacitance between the stylus and the disc surface as the information, in the form of depressions, passes beneath the stylus when relative motion is established between the disc and the stylus.

Further developments and improvements in the system have produced a video disc which is made of a conductive plastic material, e.g., a vinyl chloride polymer resin containing sufficient amounts of conductive particles, such as conductive carbon particles, so that the disc can provide capacitance readout. The carbon particles are surrounded by organic materials, such as the plastic resin and various processing additives, which provide a dielectric surface layer on the conductive particles. This development has eliminated the need for separate coatings of metal and dielectric on the plastic disc. Video discs which do not require a grooved surface have also been developed. The stylus is maintained in synchronization with the information pattern or track by means of electrical signals on either side of the information track, rather than physically by means of the grooved walls.

In order to prevent undue wear between the disc and stylus, a lubricant layer is applied to the disc surface by evaporation. Wang et al., in U.S. Pat. No. 4,275,101, has described the application of certain methyl alkyl siloxane compositions having the general formula:

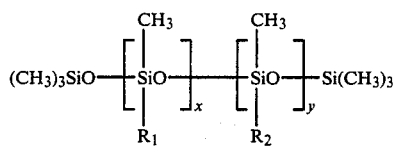

wherein $R_1$ and $R_2$ are alkyl groups of 4–20 carbon atoms, x is an integer of 2–4, y is an integer of 0–2, and wherein the sum of x and y is 4 or less, to these discs as an improved class of lubricants for video disc applications, which lubricants have improved stability and resistance.

Keizer, in U.S. Pat. No. 4,162,510, discloses a novel keel tipped pickup stylus structure for use in the capacitance electronic disc information recovery system. The keel tipped pickup stylus comprises a dielectric support element having a body, a constricted terminal portion and shoulders interconnecting the body with the constricted terminal portion. The electrode surface is remote from the prow end of the stylus. The stylus, formerly made of metallized sapphire, has also been improved so that metallized diamond can be employed. Diamond is a harder, longer wearing material than sapphire, and is thus preferred.

The information record or disc, in accordance with a preferred format of this sytem, incorporates the disc surface, which upon playback cooperates with a tracking or pickup stylus electrode to establish information-representative capacitance variations. The tracking stylus and groove shapes are preferably sufficiently correlated so that during playback a surface of the conductive stylus electrode is closely adjacent the dimension-varying bottom of the groove. A desirably linear relationship between the information-representative dimension variations in the groove bottom and the capacitance presented between the stylus electrode and the conductive disc results when relative motion between the stylus and groove occurs. Circuitry responding to such capacitance variations may readily reconstitute the recorded information in an electrical signal form with an acceptable signal-to-noise ratio. While the obtained signal-to-noise ratio of the capacitance variations is acceptable, it would be desirable to obtain an enhanced or improved signal-to-noise ratio from the surface of the conductive disc. Therefore, the search continues for means and methods of improving or increasing the signal-to-noise ratio obtainable from a capacitance electronic disc system including a conductive disc formed from a plastic resin containing dispersed conductive particles.

SUMMARY OF THE INVENTION

It has been found that the signal-to-noise ratio or carrier-to-noise of a capacitance electronic disc system can be enhanced or improved by spacing the playback stylus electrode slightly above the surface of the conductive disc; i.e., slightly removed from the information track in the conductive disc surface. By this slight spacing of the stylus electrode from the disc surface (which is a major source of noise in the capacitance electronic disc system) it is possible to maintain the desired signal at a fairly high level and at the same time to substantially reduce the noise level, thereby resulting in a significant enhancement or improvement in the signal-to-noise ratio.

BRIEF DESCRIPTION OF THE DRAWING

The single FIGURE of the drawing is a schematic representation of the improved capacitance electronic disc system of this invention.

DETAILED DESCRIPTION OF THE INVENTION

As shown in the drawing improved or enhanced signal-to-noise ratio of this invention obtainable in a capacitance electronic disc system is attained by the selective spacing of the electrode 10 of the playback stylus 11 from the surface of the conductive disc 12 of the system, which disc is formed from a plastic resin containing dispersed conductive particles. The method of attaining the improvement of this invention may also be looked at as a maintaining of the playback stylus electrode at a controlled spacing from the information track of the disc, which track contains geometric variations that cooperate with the playback stylus to establish information-representative capacitance variations. By this method of selectively spacing the playback stylus electrode from the surface of the disc, the stylus electrode is in effect spaced from the noise or source of the noise, that being the disc surface (which surface is a major source of noise in the system), while at the same time being maintained sufficiently close to the signal or signal elements to sense the same at a high level along the stylus capacitance sensing characteristic curve. Thus, by maintaining the signal at a relatively high level and decreasing the noise obtained from the disc surface, the overall signal-to-noise ratio can be improved and enhanced by this invention.

The selective spacing of the playback stylus electrode from the surface of the disc can be accomplished by coating the surface of a conductive disc, which is formed from a plastic resin containing dispersed conductive particles, with a thin coating 14 of a dielectric material. It has been found that this coating of dielectric material should have a thickness of from about 200 up to about 500 Angstroms. Thin coatings are desirable so as to increase the distance of the stylus electrode from the disc surface, which is the major source of noise, while at the same time maintaining the distance between the two (stylus and disc) at a spacing where the signal may still be sensed at a relatively high level. One means of providing this thin coating of dielectric material is to coat the conductive disc with a layer of sputtered polystyrene having a thickness of between approximately 200 and 500 Angstroms. In addition to styrene, other related or similar monomers, solid lubricants, polytetrafluoroethylene, and the like can be used to form the thin dielectric coating. It has been found that the effect of physically spacing the stylus electrode from the surface of the disc is most pronounced at frequencies below 1 MHz. In a typical example, a 715 kilohertz audio carrier-to-noise ratio was improved approximately 3 decibels (dB).

The following specific examples are included in order to illustrate the invention and the improvements obtained thereby with greater particularity. However, it is to be understood that these examples are not intended to limit the invention in any way.

EXAMPLE I

In this Example, a series of video discs were compression molded from a molding composition containing approximately 75.15 parts of PVC homopolymer resin 346 of the B. F. Goodrich Company; 14.8 parts of Ketjenblack EC carbon particles of the Armak Company; 1.5 parts of T-35 and 1.0 part of Mark 275 as stabilizers; 0.75 part of G-30, 0.25 part of G-70, 0.5 part of calcium stearate and 0.3 part of Olio de Vasilina as lubricants; 0.75 part of K-175 processing aid, 2.0 parts of K-147 processing aid; and 3.0 parts of Santicizer 711 modifier, all as referred to in and disclosed by Martin et al. in U.S. Pat. No. 4,228,050, incorporated herein by reference. The video discs were compression molded from this composition at approximately 360° F. (182.2° C.). The discs from this press run were then divided into three lots for purposes of further processing and comparative evaluation.

The discs of the first lot were used as a control for comparison purposes, and after compression molding were lubricated with a heretofore known and used video disc lubricant similar to that disclosed in Wang et al. in U.S. Pat. No. 4,275,101, as set forth hereinabove. A layer of the lubricant was applied to each disc of the lot by spraying with heptane solution of the lubricant followed by evaporation of the heptane. Thereafter, the carrier or signal-to-noise ratio for each of the discs of this first lot was measured and determined. It was found that the average audio signal-to-noise ratio on the outside portion of the disc (pre-program area) was 22.4 decibels (dB), while the average audio signal-to-noise ratio on the inside portion of the disc (post-program area) was found to be 21.6 dB for the discs of this first lot.

The discs in the second lot were treated in similar manner to the discs of the first lot, with the exception that prior to lubrication, a thin coating or layer of dielectric material (in this case a 200 Angstrom thick coating of sputtered polystyrene) was applied to the discs of this lot. Upon measurement and determination of the signal-to-noise ratio for these discs, it was found that the average audio signal-to-noise ratio on the outside portion of the disc was 23.8 dB, while the average audio signal-to-noise ratio on the inside portion of the disc was 24.4 for these discs.

The discs of the third lot were treated in similar manner to the discs of the second lot, with the exception that the coating of sputtered polystyrene was increased to a thickness of 400 Angstroms. For the discs of this lot, it was determined that the average audio signal-to-noise ratio on the outside portion of the disc was 23.4 dB, while the average audio signal-to-noise ratio on the inside portion of the disc was 24.8 dB.

EXAMPLE II

In this Example, video discs were compression molded and thereafter lubricated similar to those as set forth above in Example I, but with a different program content. One group of six discs was used as a control and their audio signal-to-noise ratio was measured and determined. The audio signal-to-noise ratio for these six discs was found to average 23.3 dB adjacent the outside portion of the disc with the signal-to-noise ratio ranging from 22.4 up to 24.4 dB. The average audio signal-to-noise ratio adjacent the inside portion of these six discs was found to be 24.1 dB, with this ratio ranging from 23.1 up to 25.3 dB.

A second group of six discs was treated in accordance with this invention by being coated with a layer of polytetrafluoroethylene prior to being lubricated. This fluorocarbon resin coating had an average approximate thickness of 500 Angstroms. The polytetrafluoroethylene coated discs were found to have an average audio signal-to-noise ratio adjacent the outside portion thereof of 25.5 dB, which ratio ranged from 24.0 up to 26.6 dB. These discs treated in accordance with this invention were also found to have an average audio signal-to-noise ratio adjacent their inside portion of 26.5 dB, which ratio ranged from 25.1 up to 27.6 dB.

It can be readily seen from a review of the above examples that the invention of this application, of selectively spacing the playback stylus electrode slightly away from the surface of the conductive disc of the system, such as by the coating of the conductive disc surface with a thin layer of dielectric material, consistently results in an enhanced or improved signal-to-noise ratio in the capacitance electronic disc system. The invention of this application provides for an increase of approximately 2–3 dB in the audio signal-to-noise ratio of the capacitance electronic disc system.

What is claimed is:

1. A method of enhancing the audio signal-to-noise ratio obtainable in a capacitance electronic disc system including a conductive disc formed from a plastic resin containing dispersed, finely divided, conductive particles and a dielectric playback stylus having an electrode face, said method comprising the step of:

spacing said playback stylus electrode at a distance of from about 200 up to about 500 Angstroms from the surface of said conductive disc by depositing a coating of a solid dielectric material on the surface of said conductive disc, said spacing being sufficient to decrease the noise sensed by said stylus electrode from the surface of said conductive particle containing disc and being limited to yet sense the signals on the said surface at a relatively high level, thereby increasing the audio signal-to-noise ratio of the system.

2. A method in accordance with claim 1 wherein said dielectric material is polystyrene.

3. A method in accordance with claim 1 wherein said dielectric material is polytetrafluoroethylene.

4. In a capacitance electronic disc adapted for use with a playback stylus to effect recovery of signals occupying a bandwidth of at least several megahertz when relative motion at a desired rate is established between said disc and said stylus, said disc being molded from a plastic resin containing finely divided conductive particles and having an information track in a surface thereof which information track is constituted by a surface relief pattern of such dimension to accommodate recovery of said signals upon establishment of said motion at said rate, the improvement comprising:

a thin coating of from about 200 up to about 500 Angstroms of a solid dielectric material deposited in said surface of said capacitance electronic disc to thereby space said playback stylus from said information track when adapted to effect recovery of said signals, said spacing being sufficient to decrease the noise obtained by said stylus from said surface of said disc and being limited to yet effect recovery of said signals at a relatively high level, thereby increasing the audio signal-to-noise ratio obtained upon playback of said disc with said stylus.

5. A capacitance electronic disc in accordance with claim 4 wherein said dielectric material is polystyrene.

6. A capacitance electronic disc in accordance with claim 4 where said dielectric material is polytetrafluoroethylene.

7. A capacitance electronic disc in accordance with claim 4 further comprising a coating of a lubricant over said dielectric material, wherein said lubricant has the formula:

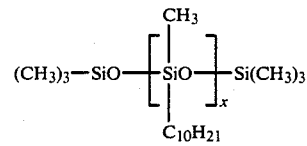

wherein x is an integer of about 2–4.